United States Patent
Ragner (12) United States Patent (10) Patent No.: US 7,617,762 B1
Ragner (45) Date of Patent: Nov. 17, 2009

(54) FLEXIBLE HYDRAULIC MUSCLE

(75) Inventor: Gary Dean Ragner, 711 SW. 75th St., #103, Gainesville, FL (US) 32607

(73) Assignee: Gary Dean Ragner, Gainesville, FL (US)

( * ) Notice: Subject to any disclaimer, the term of this patent is extended or adjusted under 35 U.S.C. 154(b) by 674 days.

(21) Appl. No.: 10/875,152

(22) Filed: Jun. 23, 2004

Related U.S. Application Data (60) Provisional application No. 60/480,727, filed on Jun. 23, 2003.

(51) Int. Cl.
*F16J 3/04* (2006.01)
(52) U.S. Cl. .......................................................... 92/37
(58) Field of Classification Search .................. 92/37, 92/39, 43, 47
See application file for complete search history.

(56) References Cited

U.S. PATENT DOCUMENTS

| | | | | |
|---|---|---|---|---|
| 2,124,735 A | * | 7/1938 | Flint | .............................. 92/39 |
| 2,847,032 A | * | 8/1958 | Fleming | .......................... 92/40 |
| 4,502,280 A | * | 3/1985 | McCoy | ............................ 92/37 |
| 4,773,218 A | * | 9/1988 | Wakita et al. | .................. 60/473 |
| 5,245,885 A | * | 9/1993 | Robertson | ....................... 92/92 |
| 5,261,317 A | * | 11/1993 | Fraser | ............................ 92/34 |
| 2003/0098084 A1 | | 5/2003 | Ragner | |

* cited by examiner

*Primary Examiner*—F. Daniel Lopez (57) ABSTRACT

A flexible hydraulic muscle (20) comprising a fluid port (22), bellow (24), end seal (28) and attachment ring (30). Bellow (24) also defines a retracting spring bias for generating contracting forces within muscle (20). Fluid port (22) is designed to provide an anchor point for the muscle, while at the same time, providing a means to introduce and remove hydraulic fluid from bellow (24). End seal (28) and attachment ring (30) provide the second connecting point for the muscle. These two anchor points on each end of bellow (24) provide connection points to communicate contracting force from bellow (24) into useful work. End seal (28) is securely attached or bonded to the end of bellow (24) to provide a fluid tight seal, and designed to resist longitudinal forces on the connection.

19 Claims, 6 Drawing Sheets

FLEXIBLE HYDRAULIC MUSCLE

CROSS-REFERENCE TO RELATED APPLICATIONS

This utility application claims priority from U.S. Provisional application Ser. No. 60/480,727, filed on Jun. 23, 2003, titled: "Flexible Hydraulic Muscle".

BACKGROUND

1. Field of Invention

The field of this invention relates to devices that produce useful work from hydraulic pressure, and more specifically devices that do useful work while hydraulic pressure is removed.

2. Description of Prior Art

The disclosed flexible hydraulic muscle is designed to extend while being pressurized with a hydraulic fluid and contract strongly when pressure is released. This is the exact reverse of known prior art, where flexible hydraulic muscles are designed to retract when hydraulic pressure is applied, and extend when pressure is released. To provide the reverse, systems can use negative pressure to contract the muscle, however these are limited to one atmosphere of force (14.7 per square inch). Bellow systems for use with actuating levers sometimes use this negative vacuum pressure to provide a retracting force, but such force is limited and requires a large system to provide large forces. Bellows may also work with pressurized air to providing a retracting force, but requires a cylinder housing and piston which does not allow the bellow to be flexible or light-weight. No known flexible bellow system was found that provides its strongest contracting force while hydraulic fluid pressure is released. Also, no known hydraulic muscle was found which uses a liquid hydraulic fluid to provide a contracting force during pressure release. The Applicant has another patent application Ser. No. 10/303, 941 (US 2003/0098084 A1) titled "Pressure-Actuated Linearly Retractable and Extendible Hose" which is for a similar device. Application Ser. No. 10/303,941 is specifically for hoses for transporting a fluid (gas or liquid) from one end to the other, and generally never flows in the opposite direction. For the Disclosed hydraulic muscle it is actually a disadvantage to transport fluid from one side to the other since this would require an additional fluid return line that is not needed. One could connect two muscles adjacent to each other and in parallel so one functions as a return line, but the fluid would still be recirculating and not actually being transported for external use.

The use of liquid hydraulic fluid, such as oil-base fluids, allow much higher operating pressures than are possible with gas-based systems. However, the flexible nature of the hydraulic muscle (without support guides) prevents it from generating significant extending force. Though strong extending force can be generate if lateral stiffening guide(s) (lateral stiffening supports) are used to prevent the muscle from bowing out of alignment. Without side support guides the muscle can simply bend in the middle. Once extended, strong tension biasing exists within the muscle, but is held in place by hydraulic pressure. When hydraulic fluid is released, this tension biasing causes a strong contracting force within the muscle. For purposes of this patent, the term hydraulic fluid will be used to refer to both liquid and gas working fluids (hydraulic and pneumatic systems).

SUMMARY

The disclosed flexible hydraulic muscle provides a strong contracting force when desired. Unlike other hydraulic muscles, this design provides useful work (contraction) when hydraulic pressure is released. This is exactly opposite the present state of art, which is designed to contract when pressure is applied. To provide contraction when hydraulic pressure is released, the muscle has a strong longitudinal biasing system to provide this contracting force. During use, hydraulic pressure is used to overcome this longitudinal biasing so that the flexible muscle can extend. To contract the muscle, pressure is released from within the muscle and the muscle contracts due to the strong longitudinal biasing. The longitudinal biasing can be provides by a number of structures. For example, coil springs (FIGS. 2, 3 and 5), flat springs, wave springs, bellow spring (FIGS. 1A and 1B), elastic polymers (FIGS. 3 and 4), high-strength density disc springs (see FIGS. 6A through 8), combinations of these (FIGS. 2, 3 and 5), etc. The longitudinal biasing is designed to bias the muscle so it returns to its shortest length (contracting force).

All of the disclosed examples can be used with any of a number of working fluids, including both gases and liquids. Throughout this patent the term "hydraulic fluid" will mean the pressurizing fluid used to extend the hydraulic muscle, and can comprise either a gas and/or liquid. For most applications the working fluid will be an oil based liquid. For some purposes, a gas can be used, such as compressed air. In general, the disclosed hydraulic muscles are designed to operate above 100 pounds per square inch pressure (psi), except for some pneumatic applications where a lower pressure and lighter weight muscle can be useful. On the other end of the scale, liquid hydraulic fluid systems can operate at pressures above 5000 psi to provide flexible hydraulic muscles with very high power density (work done per unit time) and/or very high strength density (force per unit cross section).

The disclosed flexible hydraulic muscle comprises three main components: 1) a longitudinally biasing means for providing a contracting force, 2) a longitudinally extendible hydraulic fluid containment means for containing hydraulic fluid when the muscle extends, and 3) a radial support means for resisting radial expansion of the hydraulic fluid containment means when hydraulic pressure is applied. Other auxiliary components are also needed, such as, a hydraulic fluid pressure source connection for providing application and removal of hydraulic pressure to the muscle, and an attachment means for allowing the hydraulic muscle to be connected to external components to provide useful work.

The three basic components form the core of the hydraulic muscle, and can be combined in five different ways: (1) all three components (longitudinal biasing means, containment means, and radial support) are provided by the same structure (see FIGS. 1A, 1B, 6A, 6B, 7, 9 and 10); (2) containment means and radial support means provided by the same structure, longitudinal biasing means separate (see FIG. 2); (3) longitudinal biasing means and radial support means provided by the sane structure, containment means separate (see FIG. 3); (4) containment means and biasing means provided by the same structure, radial support means separate (see FIG. 4); (5) each of the three components (longitudinal biasing means, containment means, and radial support) are provided by separate structures (see FIG. 5).

The flexible nature of the hydraulic muscle (without support guides) prevents it from generating significant extending forces, however the use of support guides (i.e. rigid supports, telescoping supports, other flexible muscles, etc.) can prevent buckling of the muscle and allow significant extending force to be generated. Without such side-force support, the muscle can simply flex out of alignment when placed in compression, greatly reducing the extending force possible. With the muscle extended, a strong tension bias exists within the muscle, which is resisted by hydraulic pressure within the muscle. When hydraulic fluid pressure is released, this tension biasing causes a strong contracting force within the muscle. It is this strong contracting force that provides useful work.

OBJECTIVES AND ADVANTAGES

Accordingly, the four main advantages of my invention are:
a) To provide a flexible hydraulic muscle that have very large contracting forces densities for doing useful work.
b) To provide a flexible high power-density hydraulic muscle for doing useful work.
c) To provide a fully articulating hydraulic arm comprising two or more of the disclosed hydraulic muscles.
d) To provide biasing tension management within the hydraulic muscle design so that the muscle can provide a relatively constant retracting force throughout the range of motion of the muscle.

DETAILED DESCRIPTION OF THE PREFERRED EMBODIMENTS

Figure 1A:
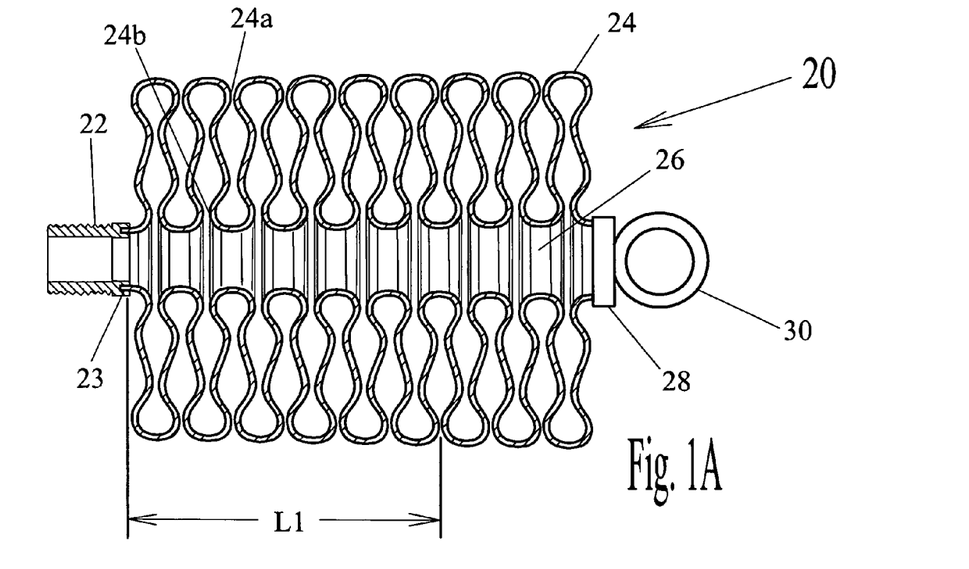
FIG. 1A Bellow style hydraulic muscle in section slightly stretched.
Figure 1B:
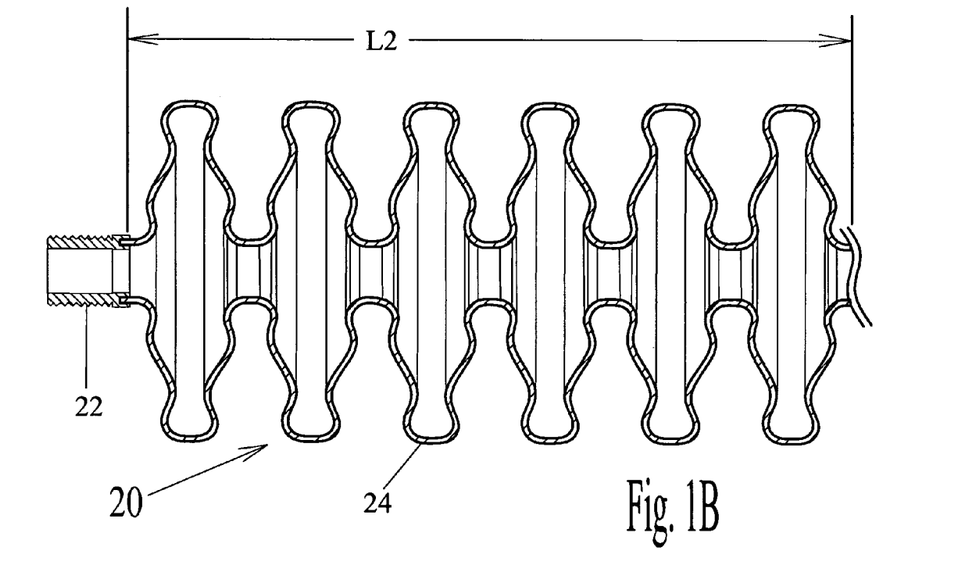
FIG. 1B Hydraulic muscle in FIG. 1 in flexible pressurized state.

In FIGS. 1A and 1B we see a flexible hydraulic muscle 20 comprising a fluid port 22, bellow 24, end seal 28 and attachment ring 30. As with the other hydraulic muscles disclosed in this patent, bellow 24 has a generally cylindrical shape, however, other cross-section shapes can be used besides round in the examples except FIG. 4 which requires a substantially round cross-section for support cords 86 to provide proper radial support. Fluid port 22 is designed to provide an anchor point for the muscle, while at the same time, providing a means to introduce and remove hydraulic fluid from bellow 24. Port 22 is shown here with a threaded connector, but other types of connectors can be used. End seal 28 and attachment ring 30 provide the second connecting point for the muscle. These two anchor points on each end of bellow 24 provide connection points to communicate contracting force from bellow 24 into useful work. End seal 28 is securely attached or bonded to the end of bellow 24 to provide a fluid tight seal, and designed to resist longitudinal forces on the connection. Similarly, fluid port 22 is securely attached or bonded to the opposite end of bellow 24, and designed to resist longitudinal forces on the connection. Bellow 24 is designed to provide a strong spring bias tending to pull port 22 and ring 30 toward each other. In its relaxed state, bellow 24 would retract fully, with substantial force exerted on outer bellow contact points 24a and/or inner contact points 24b due to the biasing. Thus, bellow 24, as seen in FIG. 1A, can produce a substantial contracting force on port 22 and ring 30, even when nearly at its completely collapsed state. FIG. 1A shows bellow 24 near its fully collapsed state, such as might occur when sufficient hydraulic pressure is introduced into port 22, or when sufficient tension is exerted on bellow 24. The curved nature of bellow 24 is designed to reduce stress points as it expands and contracts longitudinally. The disclosed shape of bellow 24 with its stacked row of discs is only an example and nearly an endless array of cross-section shapes are possible. For example, instead of a stack of disk shapes for the bellow, one can use a spiral bellow having an exterior somewhat like that of threads on a bolt. Such a spiral bellow could be made from a strip of metal bent into a substantially U-shape (or V-shaped) and welded together as the U-shaped metal is bent to form the round bellow. Such a construction method lends itself well to high-speed automated construction. The use of a strong prestress bias is also possible with the spiral bellow construction. FIG. 1B shows hydraulic muscle 20 in its extended position. The extended position is reached due to either sufficient hydraulic pressure within bellow 24 and/or by sufficient tension on bellow 24. Note the length change for L1 in FIG. 1A to L2 in FIG. 1B.

In FIG. 1B, when hydraulic pressure extends bellow 24, bellow 24 is much more flexible than when it is in its fully retracted state. This is because the walls of the bellows are not forced against one another by biasing tension. Even though tension within bellow 24 is larger, the bellow tends to balance forces on opposite sides so that only the difference in spring tension is felt when bending the bellow (when straight, this difference in spring tension is zero). Thus, even a very stiff bellow can become substantially more flexible when pressurized. This flexibility significantly limits the hydraulic muscle's use in expansion mode (extending), unless significant stiffening structures are used to keep the bellow from bending (see FIGS. 10A-D). When in retraction mode (hydraulic fluid being released), very powerful tension forces within bellow 24 are transmitted to ends 22 and 30, even around corners.

Figure 2:
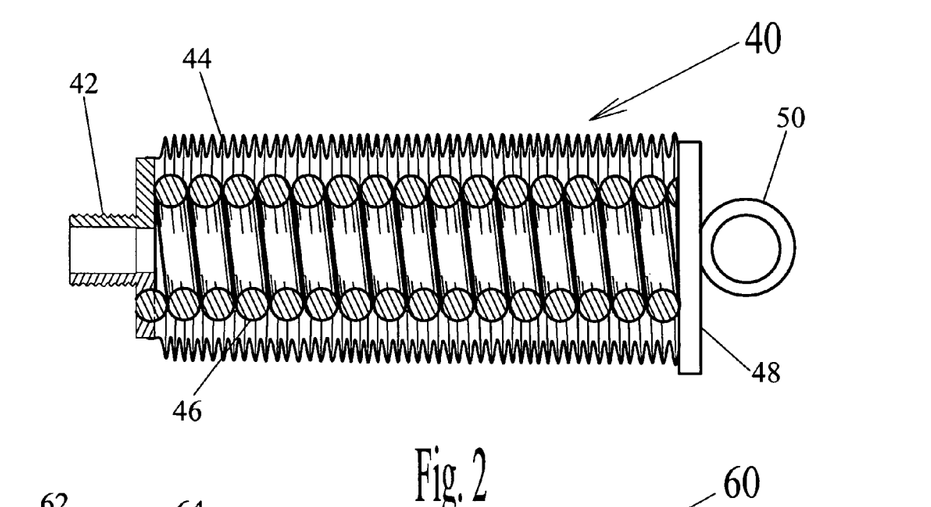
FIG. 2 Hydraulic muscle with bellow containment support and separate biasing spring.

In FIG. 2 we see a hydraulic muscle 40 comprising a fluid port 42, bellow 44, biasing spring 46, end seal 48, and attachment ring 50. Fluid port 42 includes an attachment means for connecting to a pressure source and also to provide an anchor point for muscle 40. Port 42 also includes an end seal that attaches to that end of bellow 44 and bias spring 46. Because of the open volume inside bellows 44, hydraulic fluid can enter the muscle as fast as desired (limited here by the size of port 42 hydraulic pump supply (not shown) and connecting hose size (not shown)). Thus, the disclosed hydraulic muscles can have extremely rapid hydraulic fluid flows to allow very rapid actuation of the muscle. Both the bellow and spring are securely attached to port 42 so as not to pull apart from port 42 during use. Bellow 44 makes an air-tight seal with port 42 to contain hydraulic fluid inside. Both bellow 44 and spring 46 are attached on their other end to end seal 48. Bellow 44 is again secured with an airtight seal to end seal 48 and bias spring 46 secured so as not to pull apart from end 48. Attachment ring 50 is connected to end 48 and provides a second anchor point for hydraulic muscle 40. Bellow 44 provides radial support against high pressures within its structure, and is able to expand and contract longitudinally as the muscle expands and contracts. Bellow 44 can provide some biasing of its own, but for this design most of the retracting bias force is provided by heavy bias spring 46.

Figure 3:
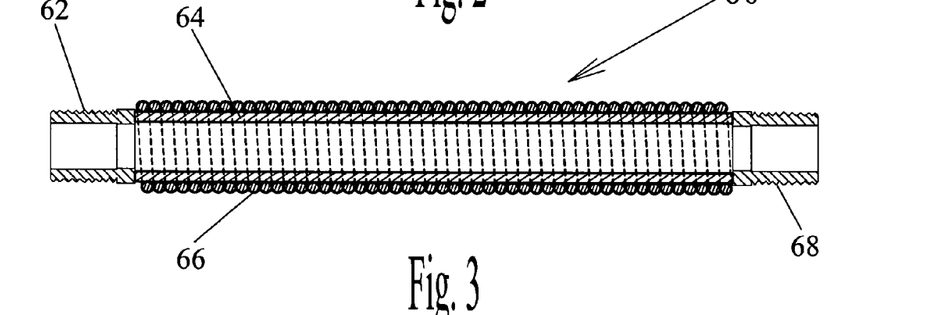
FIG. 3 Hydraulic muscle with spring biasing which also provides radial support.

In FIG. 3 we see hydraulic muscle 60, comprising fluid port 62, containment tube 64, bias spring 66, and a second fluid port 68. In the previous designs only a single fluid port was used. This design shows how a hydraulic muscle can have more than one hydraulic fluid port, in this example two fluid ports are used. There are many ways fluid pressure can be introduced to this multiple port muscle. For example, port 62 may be used to apply hydraulic pressure while port 68 is used to release hydraulic pressure. Port 68 can also be screwed into a blind socket, sealing it off, and thereby operate like a single port muscle. Port 68 may also have an attachment end piece screwed on to provide the desired connector for its use. Both ports 62 and 68 also provide the attachment points for the hydraulic muscle, however, separate attachment points can be used if desired which do not place stress on the fluid port(s). Fluid ports 62 and 68 are attached to each end of containment tube 64 and biasing spring 66. Since tube 64 provides containment of high pressure hydraulic fluid, it is hemispherically sealed at both ports 62 and 68. Tube 64 can be made of an elastic polymer or other stretchable structure. Placement of bias spring 66 is in close proximity to the exterior of containment tube 64 so that outward (radial) pressure on tube 64 is supported by the spring windings. Tension in the springs tend to make the spacing between the coils uniform so that no gaps exist where tube 64 can blister out and rupture. Tests with this type of device using surgical tubing for the containment tube and coiled spring for the bias spring worked well. Containment tube 64 provides some biasing due to its elastic nature, but for this type of hydraulic muscle the biasing due to tube 64 can be small compared to the biasing due to spring 66. Note that additional bias springs between ports 62 and 68 can be added to hydraulic muscle 60. Additional springs can be placed on the inside of tube 64 and/or outside spring 66.

Figure 4:
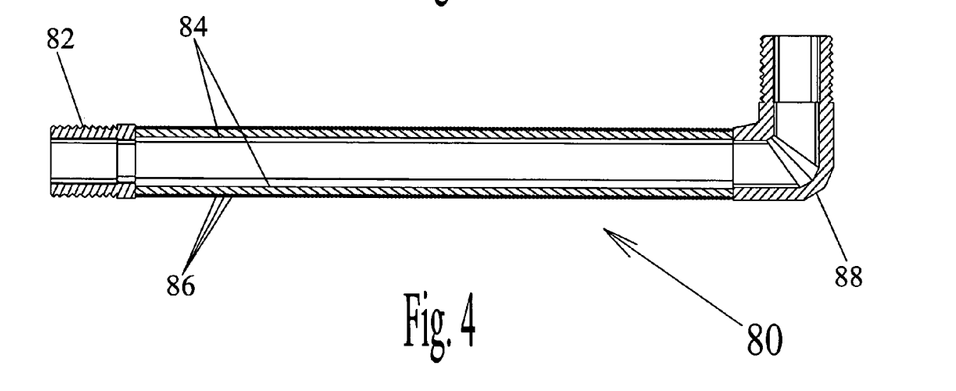
FIG. 4 Hydraulic muscle with elastic polymer biasing and wound cord for radial support.

In FIG. 4 we see hydraulic muscle 80, comprising fluid port 82, angled fluid port 88 and containment tube 84 with radial support cords 86. In this design containment tube 84 is made of an elastic material and provides both contraction biasing and containment of hydraulic fluid. Support cords 86, which are wound around the exterior portion of tube 84 provide radial pressure support to keep the elastic containment tube from expanding (and bursting) in the radial direction. This type of hydraulic muscle can only provide limited retracting force because of the limited tension that can be generated with most elastic polymer. Also elastic polymers tend to have a memory and can become deformed if left stretched for long periods of time. Right-angle fluid port 88 provides another example of how a hydraulic muscle can be connected to structures to be moved by the muscle. Containment tube 84 is securely attached on each end to fluid ports 82 and 88. Many different ways exist for attaching of flexible tubing to ports 82 and 88. In FIG. 4, the attachment means is shown as just a simple bonding interface. Other bonding techniques, including crimping, gluing, fusing, riveting, etc. can be used. Radial support cords 86 are bonded to the outer surface of containment tube 84, but can also be molded within the outer surface of tube 84. Cords 86 need to be fixed to tube 84 so they do not slip out of position during use. Slippage of the cords would allow larger areas of tube 84 to lack radial support, which can cause the tube to expand through this opening in the radial support, and rupture.

Figure 5:
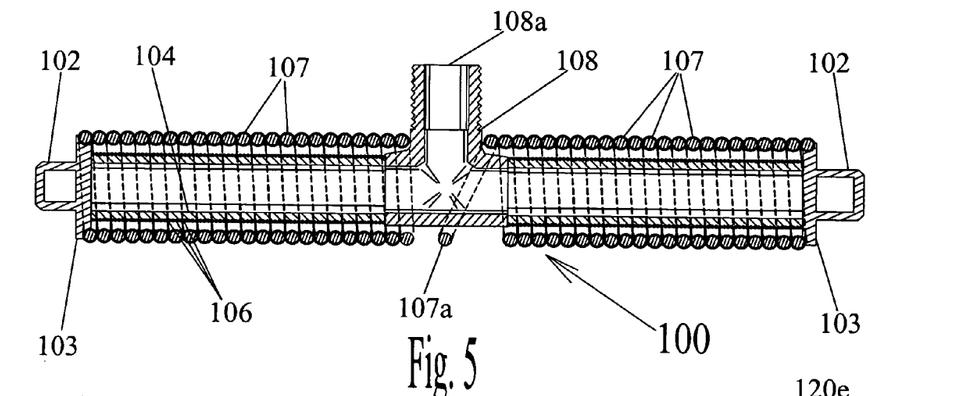
FIG. 5 Hydraulic muscle with separate bias, containment, and radial support components.

In FIG. 5 we see hydraulic muscle 100, comprising a center mounted fluid port 108, two end seals 103 each with an attachment loop 102, a pair of containment tubes 104 each with radial support cords 106, and a biasing spring 107 attached between end seals 103. Containment tubes 104 are sealed between fluid port 108 and its respective end seal 103 so that a cavity is formed within muscle 100 and the only opening being port 108a on fluid port 108. Fluid port 108 is shown near the middle of the hydraulic muscle to show another variation on placement of ports and attachment connectors. Bias spring 107 is attached securely at each end seal 103. Spring 107 is set away from containment tube 104 so that it does not provide radial support for the containment tube. This arrangement means that the three structures; containment tube, radial support, and biasing spring, are provided by three different components. This is in contrast to the hydraulic muscles in FIGS. 1 and 6, which all three structures are provided by a single component. This design can also place the bias spring inside the containment tube. If tube 104 and fluid ports were made larger in diameter and bias spring 107 were made smaller in diameter, spring 107 could be placed entirely inside the fluid cavity of the hydraulic muscle, connected between the two end seals 103. The bent section 107a of spring 107 would not be needed since there would be no obstructions down the center of the containment tubes. If the spring tension is kept the same, the larger diameter of the containment tube would allow lower hydraulic pressure to provide the same extending force. Alternatively, if the same hydraulic pressure is used, a much stronger bias spring can be used with the larger diameter containment tube. Thus, for the same diameter muscle, an internally mounted bias spring can allow greater forces given the same hydraulic operating pressure.

Figure 6A:
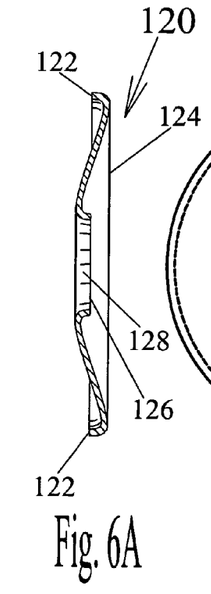
FIG. 6A Stamped washer for hydraulic muscle—sectioned side view.
Figures 6B, 7:
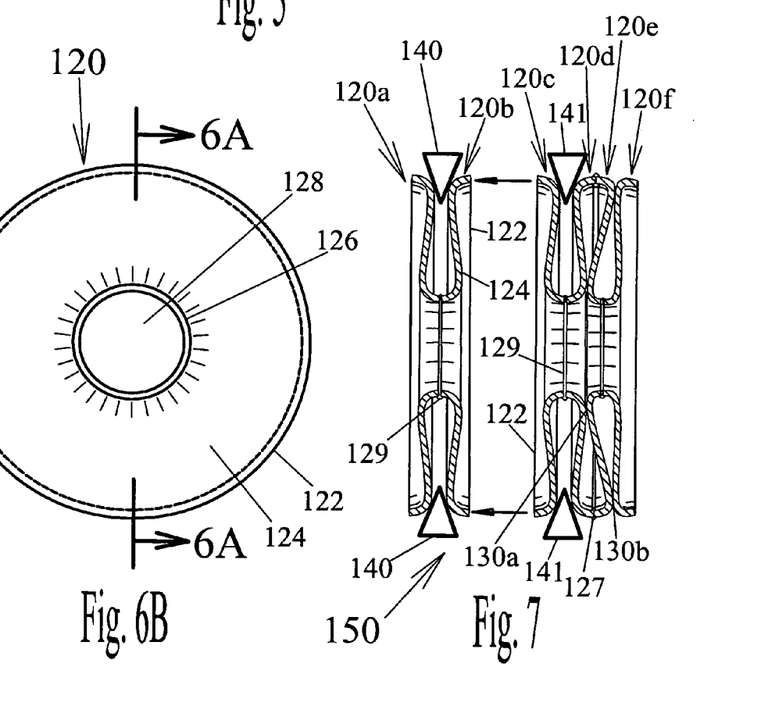
FIG. 6B Stamped washer for hydraulic muscle—front view.
FIG. 7 Hydraulic muscle assembly method with stamped washers.

In FIGS. 6A, 6B and 7 we see another hydraulic muscle 150, which is very similar in construction to hydraulic muscle 20 seen in FIGS. 1A and 1B. Muscle 150 is composed of identical washer shaped discs 120, which are made to provide a curved shape shown in FIG. 6A and a hole 128 through the center. The cross sectional shape of disc 120 can take many forms, in this example a simple "S" shape is used, but can just as easily be more rectangular or other shape (see FIG. 1A).

Disc 120 is made of a spring steel or other elastic material or composite, and shaped such that, when assembled it can be prestressed to provide a strong contracting force on the hydraulic muscle. Each disc 120 is comprises a main washer shaped body 124, with angled outer lip 122 and angled inner lip 126. Inner lip 126 forms a center hole that fluid can flow through, and a lateral stiffening structure can extend through. In this example, the end surfaces of lips 122 and 126 lay in the same plane when unstressed (no external forces applied). The same disc, when assembled into a hydraulic muscle (see FIG. 7) has considerable longitudinal offset between the inner and outer lip edges 122 and 126 even when relaxed, (see disc 120e). This offset provides a built in strain within each disc that tends to provide a minimum tension on muscle 150. This means that retracting force can remain strong right up to the point where the surfaces of discs 120 bottom out (fully retracted).

In FIG. 7 we see discs 120 being assembled. Inner lips 126 of adjacent discs are connected by welding or other connecting systems. Both metals and composites can be used. Composites may require metal brackets to connect discs together securely. For metals, spin welding would work well (disc spun around its symmetric axis), since very little heat is generated during the spin weld process which can cause the tempered discs to lose their resiliency. Each disc must be prestressed before welding because lips 122 and 126 are not able to contact their corresponding lip on the next disc in their unstressed state. The discs can first be bonded in pairs at lips 126 as seen with discs 120a and 120b in FIG. 7. If metal discs are used, a spin weld joint 129 can result. Pairs of discs like 120a and 120b can then be bonded together to form a long hydraulic muscle. Spreader blocks 140 and 141 are shown in FIG. 7 as a means of providing strain on discs 120a-120b, and discs 120c-120d respectfully. Blocks 140 and 141 can provide the holding force while the discs are being spun relative to one another to bond them together (spin welding). In FIG. 7, notice that outer lip 122 of disc 120b is pushed out in front of disc surface 124 so that it can be brought in contact with lip 122 on disc 120c which is also being prestressed by blocks 141. Blocks 140 and/or blocks 141 are spun to provide a differential speed between lips 122 on discs 120b and 120c. When forced together these two lips (122 on disc 120b and 122 on disc 120c) fuse, forming a strong and airtight joint 127.

Figures 8, 8A, 8B, 8C, 9:
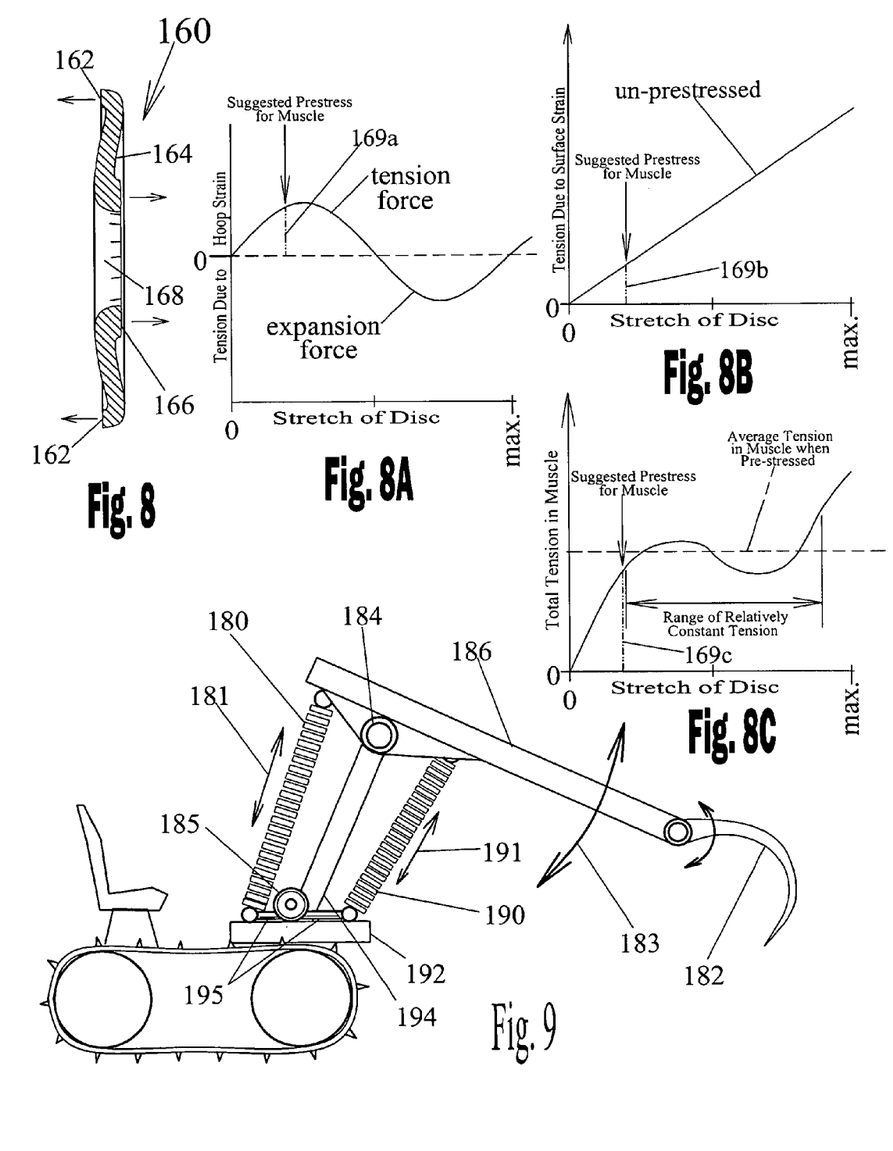
FIG. 8 Alternative disc for a hydraulic muscle assembly.
FIG. 8A Graph of longitudinal tension due to "hoop strain" in alternative disc of FIG. 8.
FIG. 8B Graph of longitudinal tension due to "surface strain" in alternative disc of FIG. 8.
FIG. 8C Graph of total longitudinal tension in alternative disc of FIG. 8.
FIG. 9 Example of use for disclosed flexible hydraulic muscles.

In FIG. 8 we see and alternative disc 160 for very heavy lifting and very high hydraulic pressures. Disc 160 would be used similarly to disc 120, but heavier construction allows higher hydraulic pressures and flatter construction allows more biasing material to be packed into the same volume. Notice that the disc body 164 must be prestressed to allow bonding (welding) of surfaces 162 and 166 to corresponding surfaces on another disc. Notice that the strain (deformation) needed to mate surfaces 162 of two discs, and the strain needed to mate surfaces 166 of two discs is much smaller than for disc 120. Even so, disc 160 can provide considerably more stress (force) even with this smaller strain. Hole 168 near the center of disc 160 provides fluid to flow through the length of a hydraulic muscle composed of these discs. The hole can be made smaller to provide more spring material for added strength or greater range of motion.

FIG. 8A shows a graph of the longitudinal tension on disc 160 (similar for muscles 150 and 20) due to the hoop strain within body 164 of the disc as it is stretched longitudinally. In its unstressed state, hoop stress is zero. However, hoop strain increases until body 164 is substantially perpendicular to the longitudinal axis of the disc and then decreases again. The longitudinal tension in the muscle due to this hoop strain depends on a number of factors including the angle at which the force generated by the hoop strain is directed. For example, at maximum hoop strain (midpoint along graph), the tension contributed by the hoop strain is zero because the forces are perpendicular to the longitudinal tension. After passing this maximum hoop strain, the forces due to hoop strain change direction and now actually provide a force trying to extend the muscle. This expansion force is represented as the negative portion of the graph. The tension force due to hoop strain again goes to zero as the hoop strain drops to zero on the other side of the perpendicular. An arrow marks the "Suggested Prestress for the Muscle" for the stretch existing in disc 160 when welded together to form a hydraulic muscle. This prestress is designed to place the retracted length near the start of a "Range of Relatively Constant Tension" (see FIG. 8C) and can provide a muscle with relatively constant tension force during operation. Note that the graphs in FIGS. 8A-C are for disc 160 by itself, being stretched longitudinally from its unstressed shape to its maximum deformation. When Disc 160 is placed in a hydraulic muscle by welding several discs together, the disc must be prestressed in order to weld the 162 surfaces and the 166 surfaces together. Thus, all external tension on the muscle will drop to zero abruptly for all three graphs where all the discs contact each other, stopping further contraction of the muscle. This drop in tension is shown on the graphs by broken lines 169a-c in FIGS. 8A-C respectfully.

FIG. 8B shows a linear surface strain relationship for disc 160. The tension starts at zero with the muscle (disc 160) un-stretched, and then increases linearly with displacement of lip surfaces 162 and 168 relative to each other. The graph in FIG. 8B assumes disc 160 stretched by itself. When put into a muscle, discs 160 will need to be prestressed in order to weld the discs together. The graph marks the prestress generated during assembly and is marked by the arrow "Suggested Prestress for Muscle". When disc 160 is assembled in a muscle, the tension within the muscle would drop abruptly to zero (see broken line 169b) when fully retracted at its prestress point. That is, discs 160 in the muscle would bottom out against one another, stopping contraction and canceling tension.

FIG. 8C shows what a graph of total tension verses longitudinal strain (stretch) of muscle might look like for a muscle composed of discs 160. The sum of the tension from hoop strain and surface strain give the graph shown. Tension rises rapidly and then slows abruptly stops, then reduces, stops again, and then increases again as shown. The result is a range of relatively constant tension in the muscle (disc 160). Note that the term "relatively constant" is used loosely, since tension varies significantly within this range, but hovers around an average tension value marked by the horizontal dashed line. These graphs in FIGS. 8A-C are specific to this particular disc 160, which can be modified to suit specific needs simply by adjusting the shape and angles of the discs making up the hydraulic muscle. For this particular design the prestress is suggested to be place at the beginning of the "Range of Relatively Constant Tension" so that the muscle can provide relatively even tension force during operation. For other applications (i.e. hydraulic arms FIGS. 10A-D), the dip in tension shown in FIG. 8C is not desirable and is easily flattened out by design so that the muscle's tension force is always increasing with increasing strain (stretch of disc). Muscle tension in such a muscle, would generally increase in a non-linear tension manner, but could have a relatively slow linear tension increase with strain if desired (a high prestress biasing can help accomplish this).

In FIG. 9 we see a simple piece of lifting equipment (simplified backhoe) with a scoop bucket 182. The design is greatly simplified for example purposes. A real piece of equipment would have a much more complex set of joints and movements. The lifting arm in FIG. 9 is constructed on platform 192, with support arm 194 extending upward from platform 192. Two flexible hydraulic muscles 180 and 190 are attached to platform 192 and extend up to lever arm 186 and attach to lever arm 186 at two different places to provide opposite torques about pivot joint 184. The torques created by muscles 180 and 190 do not have to be exactly opposite as shown, but can use off angles to generate two direction motion as long as the torques generated are in different directions. Pivot joint 184 on lever arm 186 is attached to the top portion of support arm 194 to provide a pivot axis for the lever arm. This allows lever arm 186 to lift and lower bucket 182 as shown by arrows 183. Contraction of hydraulic muscle 180 forces lever arm 186 in the counter-clockwise direction as seen in FIG. 9 and raises bucket scoop 182. Contraction of hydraulic muscle 190 forces lever arm 186 in the clockwise direction, lowering scoop 182. Since both hydraulic muscles 180 and 190 cannot produce significant extending force (without lateral stiffening support), two muscles are used, one for each direction of motion. Muscles 180 and 190 can extend and contract as shown by arrows 181 and 191 respectfully. Notice that either hydraulic muscle can be replaced with a simple tension spring to provide a return force when the other hydraulic muscle is extending. For example, replacing muscle 190 with a tension spring still allows hydraulic muscle 180 to lift loads placed in bucket 182. When muscle 180 is pressurized and extends, tension in the tension spring (replaced muscle 190) pulls the bucket down so that muscle 180 remains tight (tension on muscle 180). As long as muscle 180 is significantly stronger than the tension in the tension spring the device can operate. For strong downward forces on scoop 182, the tension spring can have a tension value near maximum bias tension of muscle 180. Note that the tension spring could also be removed, with only muscle 180 operating the lever arm, since gravity will tend to lower bucket 182 (rotate in clockwise direction) without external assistance (gravity providing clockwise torque), though the digging ability of this backhoe would be significantly impaired. Similarly, muscle 180 can be replaced with a tension spring and muscle 190 would provide the force to lower bucket 182 (lever arm 186 rotates clockwise). Then to lift a load in bucket 182, muscle 190 would be pressurized and tension in the tension spring (replaced muscle 180) would lift the bucket. Since lifting bucket 182 is less power intensive than digging with the backhoe, a tension spring that replaces muscle 180 can have a tension that is only a fraction of the maximum tension bias of muscle 190.

In FIG. 9, muscle 190 can be removed and operated only with muscle 180. In such a design, gravity can be used to low bucket scoop 182. However, if powered lowering is desired (which is normal for a backhoe), muscle 180 can be modified so that it can provide significant extending force along with its powerful retracting force. All the hydraulic muscles disclosed in this patent can be outfitted with lateral stiffening support guides comprising telescoping supports, slides, journal bearings, or etc. to prevent the muscle from bending while extending and retracting. These supports would prevent the hydraulic muscle from bending and bowing to the side when placed under compressive stress. These stiffening support guides can be place inside and/or outside the hydraulic muscle. If placed inside a hydraulic muscle using an oil based hydraulic fluid, the stiffening support structure gains the advantage of being self-lubricated. If the stiffening support is placed on the outside it has the advantage of protecting the muscle inside. Note that the addition of stiffening supports eliminates the advantage of flexibility of the muscle. However, for applications where the majority of force is needed in contraction and only small amounts of extending force is needed, the stiffening structure can be made much lighter-weight than that needed for a standard hydraulic piston that produces a similar extending and retracting force. For the backhoe example in FIG. 9, the largest force is during the downward scooping motion (lever arm rotating clockwise), thus muscle 180 can be eliminated and a laterally stiffened muscle 190 can be used alone to provide a high contracting force (hydraulic pressure being released) and also an extending force (hydraulic muscle being pressurized) to lift scoop 182. Another way of accomplishing this is to use a hydraulic arm similar to arm 200 to replace the single muscle 190. In this way, scoop 182 can be moved up and down by a single hydraulic arm. Fluid flow in and out of the arm would be controlled so that during forceful extension, the arm remains straight. The advantage would be that the hydraulic arm could do the same job as a double action hydraulic piston with less weight and less cost.

In FIGS. 10A through 10D we see a hydraulic arm 200, comprising four flexible muscles 202a-d connected adjacent and parallel to each other along their length by several connecting plates 205. In this design, multiple flexible muscles 202a-d are used to provide support to each other and prevent bending under compressive loads. The result is hydraulic arm 200, which can extend, contract, move up-and-down and move side-to-side with considerable force. Each flexible muscle 202a-d comprises multiple expansion sections, with muscles 202a-d each being composed of twenty-five muscle segments 204a-d, respectfully. Flexible muscles 202b and 202d are hidden directly behind muscles 202a and 202c, respectfully in FIGS. 10A, 10C and 10D. Muscle segments 204a-d can comprise any number of different flexible muscle designs including designs shown in this patent. The examples in FIGS. 1A-B, and 6A-8 provide individual disc segments, which may be easily connected to each other by connecting plates similar to connecting plates 205. While examples in FIGS. 2 through 5 show muscle sections that could be connected in series with plates 205 connecting them at the interface between muscle sections.

The flexible muscles 202a-d in FIGS. 10A-D are shown using muscle segments similar to those in FIGS. 6A, 6B and 7. For the example in FIGS. 10A-D, muscles segments 204a-d can be constructed of disc segments similar to disc plates 120 seen in FIGS. 6A through 7, to provide a large longitudinal expansion-ratio (extended length divided by retracted length), a large spring-bias force, and also a low hydraulic fluid volume (amount of fluid within muscle) in its contracted position. A stronger muscle might use thicker disc segments, like disc 160 shown in FIG. 8, to provide greater biasing force (retracting force), but probably a smaller longitudinal expansion-ratio. These repeating discs provide many locations where connecting plates 205 may be connected between each of the flexible muscles 202a-d. For example, the hydraulic muscle in FIG. 7 could be connected to plates 205 at the outer weld joints 127. Each muscle would generally have many muscle segments, which corresponding one another and would be connected by connecting plate 205 (see FIGS. 10A-D). Connecting plate 205 can be connected at every outer weld joint 127 (see FIG. 7), but generally having one connecting plate every few muscle segments would probably be sufficient to prevent bowing-out of the muscle between connecting plates while under compressive loads. Alternatively, the connecting plates could be connected between the muscle segments, such as at welds 229. The connecting means between muscle segments and connecting plates 205 can be any of a number of possible bonding methods, such as, welding, adhesives, mechanical clamps, etc.

The center-to-center distance between the flexible muscles (see FIGS. 10B and 11B) is determined by the particular use for hydraulic arm 200 and hydraulic arm 250, respectfully. Muscles 202a-d can be positioned adjacent and nearly touching each other, to provide a more compact hydraulic arm, or further apart as shown in FIGS. 10A-D to provide better leverage for the flexible muscles so that they have a greater lift-to-weight ratio. In FIGS. 11A-D we see, that the distances between the flexible muscles 202a-d do not need to be the same and the muscles themselves can be different sizes (different diameters—not shown) depending on the desired use. Also, the number of flexible muscles used will also depend on the particular use for the hydraulic arm. As little as two flexible muscles can be used if only movement within a 2-dimensional plane is desired. Three or more flexible muscles would be combined to provide movement within a 3-dimensional volume. Depending on the need, several flexible muscles may be used to provide a more symmetric maximum force output. The configuration shown in FIG. 10B, provides a relatively symmetric force output, but would provide the greatest force in the up/down and left/right directions, with the diagonal directions providing the least force, because only one flexible muscle is on each side provides bending torque in the diagonal direction, while there are two flexible muscles on each side when bending up, down, left or right. The distance between the center axis for the muscles in the diagonal is 1.414 times as great than the distance in the horizontal and vertical. Thus, the diagonal bending force would actually provide a force 0.707 times that of the bending force in the horizontal or vertical directions, not just half. If greater force is desired in a particular direction, then the flexible muscles may be arranged to provide that greater force by increasing the number or size of flexible muscles in that direction (i.e. adding flexible muscles above and below muscles 202a-d in FIG. 10B to provide greater force in the vertical direction), and/or by increasing the distance between the muscles, as seen in FIGS. 11A-D, in that direction (i.e. flexible muscles 202a-b are positioned a greater distance away from muscles 202c-d as shown in and FIGS. 11A-D to provide greater force in the vertical direction).

Other muscle designs, such as, those in FIGS. 2 through 5 may also be used to produce a working hydraulic arm. Several muscle segments can be used with their longitudinal length made shorter than shown in FIGS. 2-5. Several muscle segments can be connected end to end to provide a longer muscle, with the connection point between muscles providing solid attachment points for connection plate 205. In general, a spring becomes unstable if its free length to mean diameter is greater than four. Longer sections would be susceptible to buckling. For example, the muscle 40 in FIG. 2 could be modified so that it only has a few coils in bias spring 46, so that the longitudinal length of spring section 46 when extended is less than four times the diameter of the spring section. This significantly reduces the muscles longitudinal length and greatly reduces the likelihood that the muscle will buckle or bow-out when providing an extending force. End seal 48 would be modified to include a hole for hydraulic fluid to flow through. Connector 50 would be removed and another section of shortened muscle 40 would be connected to the opposite side of end seal 48. This structure would be repeated until the desired length of muscle is obtained. The end seals between each short muscle section would act as anchor points for connecting plates 205 as seen in FIGS. 10A-D, or other connector device between the flexible hydraulic muscles.

Hydraulic arm 200 is connected at the rear to wall plate 220 which supports arm 200 and at the front to end plate 212. Arm 200 is connected securely to wall plate 220 and hydraulic fluid is introduced and removed from flexible muscles 202a-d at this connection to wall plate 220. A threaded connection similar to connector 22 and 42 may be used to provide both attachment of flexible muscles 202a-d to wall plate 220 and provide attachment to a hydraulic fluid supply. End plate 212 is securely attached to the front end of muscles 202a-d and supports a gripping device 210. A claw-style gripping device 210 is shown here for example, but the gripping device can be nearly any type of gripping device desired.

Figure 10A:
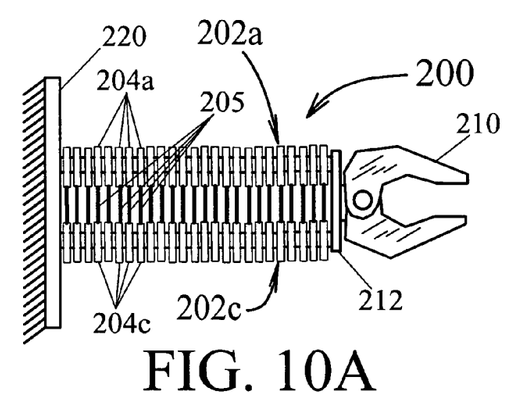
FIG. 10A Multiple flexible muscles used together in parallel—retracted position.
Figure 10B:
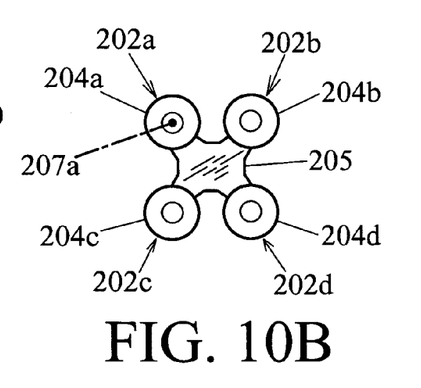
FIG. 10B Section view of Multiple flexible muscles in FIG. 10A.

In FIG. 10A we see hydraulic arm 200 in its retracted position. Hydraulic pressure within flexible muscles 202a-d may be zero or any pressure below the pressure needed to overcome the prestress bias in the muscles (which can be significant). Muscles 202a-b may have greater prestress bias than muscles 202c-d, because a greater force in the upward direction is more likely occur while lifting a heavy object than in any other direction. This greater spring bias allows a greater retracting force on the top of arm 200 (muscles 202a-b) and a greater extending force on the bottom of arm 200 (muscles 202c-d). In fact, muscles 202c-d may not require any prestress bias (or very little) since it must at least support its own weight, thus allowing a lower hydraulic pressure to provide the same amount of extending force on the bottom of arm 200. Corresponding muscle segments 204a-d of muscles 202a-d are connected by plates 205 in FIGS. 10A-B and plates 255 in FIGS. 11A-D, with each particular plate 205 and 255, respectfully connecting a set of muscle segments which move as a unit.

Figures 10C, 10D:
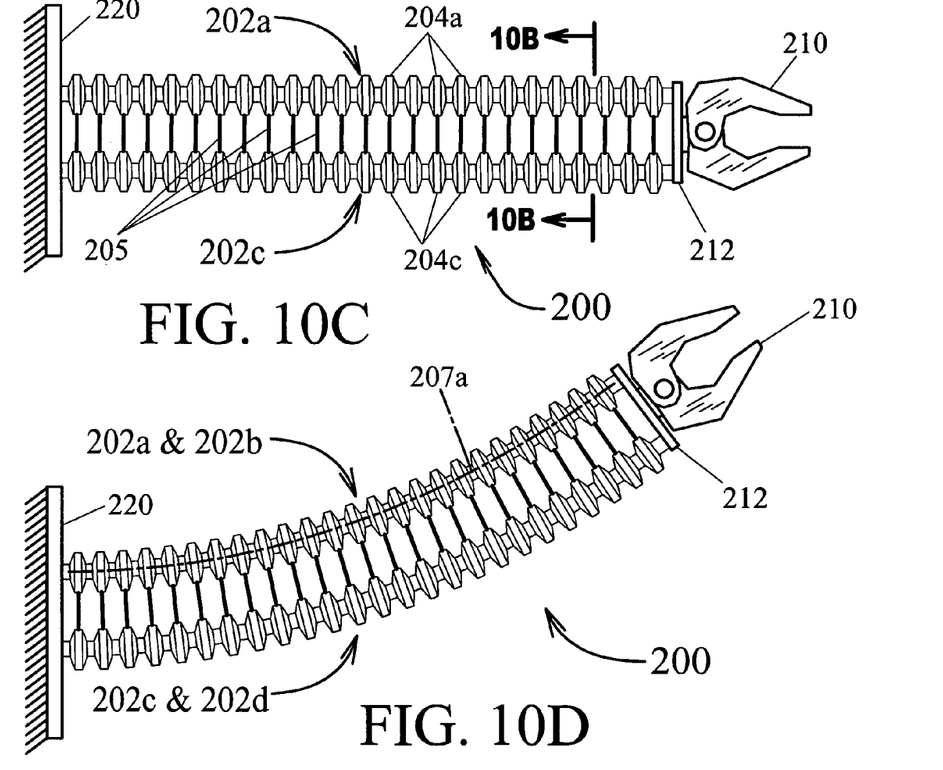
FIG. 10C Multiple flexible muscles used together in parallel—extended example.
FIG. 10D Multiple flexible muscles used together in parallel—articulated example.

FIG. 10B shows a section view of hydraulic arm 200 at the cut plane shown in FIG. 10C. Each of the four flexible muscles 202a-d are shown connected by connector plates 205. These plates provide a constant distance between each muscle so that they remain substantially parallel and adjacent to each other even during bending. In FIGS. 11A-D, muscles 202a-d are similarly connected by plates 255, but provide a tapered spacing between muscle segments 204a-d so that muscles 202a-d are not positioned substantially parallel to each other.

Figure 11A:
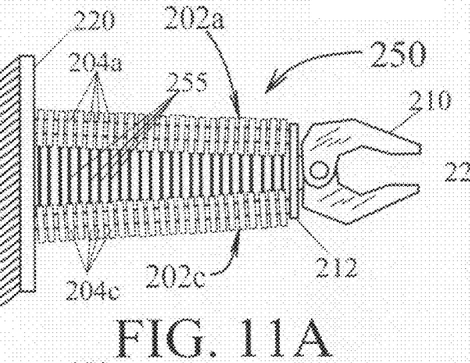
FIG. 11A Multiple non-parallel flexible muscles used together—retracted position.
Figure 11B:
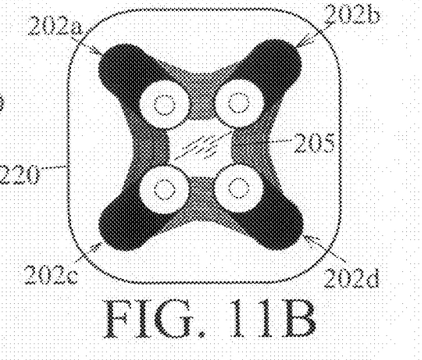
FIG. 11B Section view of hydraulic arm 250 in FIG. 11A, showing tapered spacing of plates 255, which make flexible muscles 202a-d not positioned parallel to each other.
Figures 11C, 11D:
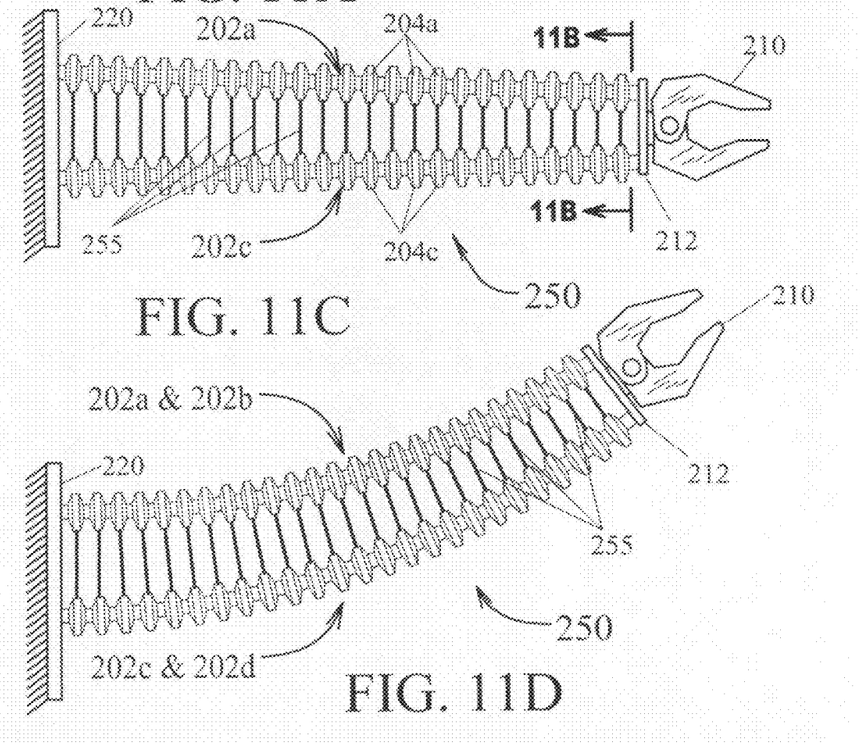
FIG. 11C Multiple non-parallel flexible muscles used together—extended example.
FIG. 11D Multiple non-parallel flexible muscles used together—articulated example.

FIGS. 10C and 11C show hydraulic arm 200 and hydraulic arm 250, respectfully, extended under hydraulic pressure. Substantially the same amount of hydraulic fluid has been forced into each of muscles 202a-d so that they all are extended to substantially the same length. Connecting plates 205 and 255, in FIGS. 10C and 11C, respectfully, maintain the adjacent spacing between muscles 202a-d. Note that the pressure within each muscle, in general, will not be the same. If a downward load is placed on gripper 210, the pressure will be greater within muscles 202c-d than muscles 202a-b (provided they are of similar design), because the bottom muscles 202c-d are in longitudinal compression while the top muscles 202a-b are in longitudinal tension.

FIGS. 10D and 11D show hydraulic arm 200 and hydraulic arm 250, respectfully, extended under hydraulic pressure with slightly different amounts of hydraulic fluid forced into muscles 202a-b than muscles 202c-d so that muscles 202a-b are substantially shorter than muscles 202c-d. The result is arm 200 (FIG. 10D) and arm 250 (FIG. 11D) curves upward as shown with force and resists further bending unless hydraulic fluid is added or removed from one or more muscles 202a-d. In this configuration, the flexible muscles 202a-d support each other and allow hydraulic arms 200 and 250 to become very rigid even though it is made of flexible hydraulic muscles. To understand why this is so, let us first consider why muscles 202a-d are flexible in the first place.

If one takes muscle 202a out of arm 200, one would find that when extended (segments not in contact with each other) the muscle is quite flexible relative to the pressure and biasing forces involved. One would also notice that muscle 202a is relatively inflexible longitudinally, that is, it is not easily shortened or lengthened without removing or adding fluid respectfully.

Lets first look at why an individual muscle of the designs shown can be very flexible. Consider centerline 207a defined on muscle 202a, where centerline 207a follows the path described by the center of each muscle segment 204a (see FIGS. 10B and 10D). The length of centerline 207a is substantially fixed for a given amount of hydraulic fluid within muscle 202a. This is because muscle segments 204a, which comprise muscle 202a, cannot change volume significantly without longitudinally extending or contracting. Thus, when in compression, the length of centerline 207a resists compressing because the hydraulic fluid within it is not very compressible and each of the muscle segments 204a cannot change its volume significantly without expanding longitudinally. The result is pressure builds up rapidly within the muscle to resist the applied compressive force. In tension the length of centerline 207a of muscle 202a resists extending because as soon as the muscle begins to extend, the volume within muscle 202a increases rapidly, but the volume of hydraulic fluid stays relatively the same. This results in a rapid drop in pressure of the relatively incompressible hydraulic fluid. Thus, as the muscle extends the bias tension within the muscle is no longer resisted by the hydraulic fluid pressure and bias tension increases to match the applied tension force. Thus, muscle 202a resists longitudinal deflection from both compression and tension force along its centerline length when the hydraulic fluid is not allowed to flow in or out of the muscle. However, now consider what happens if the centerline 207a remains the same length, but muscle 202a is bent or curved (see FIG. 10D for example). In this case there is very little force needed to bend the muscle, because neither the volume of the muscle nor the bias tension within the muscle needs to change significantly. When bent, muscle 202a contracts on one side and expands slightly on the other. Thus, the volume increase on one side of the muscle can receive the volume of the decrease on the other side. Similarly, the tension on the contracting side decreases, but a corresponding increase in tension on the expanding side nearly cancels this decrease so that the net bias tension is only changed by a small amount. The result is that muscle 202a can be kinked relatively easily by compression forces, but the muscle provides significant resistance to both compression and tension forces that would try to change its centerline length 207a (assumes no fluid flow into or out of the muscle).

While muscles 202a-d are quite flexible by themselves, when combined as shown in FIGS. 10A-D, arm 200 with its multiple muscles 202a-d, can become quite rigid when hydraulic fluid is held to a fixed volume within the muscles. The flexible muscles 202a-d actually support each other through connectors 205 to prevent bending or kinking of the muscles. When one tries to place a kink in arm 200 (muscles 202a-d all bent at the same time) the muscles must extend or contract their centerline length to accommodate this kink. However, significantly changing the length of any of the muscles requires fluid to flow into or out of the muscle, otherwise significant changes in tension and/or compressive force within the muscle result. For example, in FIG. 10C, arm 200 is substantially straight. If gripper 210 is supported by a block and the hydraulic valves to flexible muscles 202a-d are closed, then a downward force applied in the middle of arm 200 will not result in significant bending of arm 200. This is in spite of the fact that all the muscles 202a-d could easily bent if by themselves. To understand why this is so consider what must happen if muscles 202a-d are bent. Each muscle can no longer bend by themselves because connector plates 205 lock them at a specific distance from the other muscles. This means that if one muscle bends then all the muscles must bend similarly. However because of the spacing between the muscles, this means that one muscle must contract while the other muscle extend. From the discussion above we know that the muscles resist changing their centerline length when fluid volume is fixed. Thus, as one presses down on the middle of arm 200, muscles 202a-b start to be compressed and hydraulic pressure quickly increases. At the same time muscles 202c-d start to extend, but with hydraulic fluid volume fixed, pressure within these muscles would quickly drop and the bias tension forces quickly rise to offset the applied load. Both these changes tend to quickly counteract the applied force and prevent the arm from bending significantly.

From the discussion above we see that hydraulic arm 200 can move gripper 210 around in three-dimensional space by simply changing the volume of fluid within the four muscles 202a-d. In fact, since arm 200 has muscles which can expand to twice their retracted length, gripper 210 could be twisted back to wall 220 if the muscles on one side of the hydraulic arm are fully extended an the other side are fully retracted. If arm 200 was even longer, it could twist into a corkscrew shape if it wanted, and when hydraulic fluid flow is stopped, would become very rigid in that position. Thus, the position of the gripper end 210 is determined by the actual volume of hydraulic fluid (for substantially incompressible liquids only) within each muscle, while the force exerted by the arm is determined by the hydraulic pressure within each arm. Changing forces on a stationary arm 200 (no fluid flow), result in changes in the hydraulic pressure within the muscles to counteract the applied forces and maintain its position. For pneumatic systems such stable positioning is not possible because of the easy compressibility of gasses.

Hydraulic arm 200 also can have a built-in over-pressure features to prevent excess pressure from damaging the flexible muscles. If in FIG. 10D, arm 200 is overloaded suddenly with a downward impulse at gripper 210, hydraulic pressure will tend to increase in muscles 202c-d and decrease in muscles 202a-b. The load on muscles 202c-d can only increase to the point at which hydraulic pressure within muscles 202a-b reaches zero (approximately zero vapor pressure for oil). After that point, cavitation of the hydraulic fluid results, and muscles 202a-b will extend against its own spring biasing force. Thus, the compression force on muscles 202c-d is limited, and arm 200 bends downward when overloaded. However, cavitation of the hydraulic fluid can create a rapid backlash as spring biasing forces quickly snap the arm back into position after the impulse load is gone. This "snapping back" can create damage as the end of the cavitated muscle slams back into the substantially incompressible hydraulic fluid. Thus, some form of valving system can be used to release hydraulic fluid into a muscle if it reaches a pressure near its cavitation pressure. In this way impulses will tend to be dampened without dangerous pressure changes within the flexible muscles.

Hydraulic arm 200 can be constructed in many different ways. For example, the hydraulic muscles do not need to have a constant diameter along its length, but can be tapered (conical), so that the portions of the muscles nearest wall 220 would have a larger diameter to provide greater strength at this location where bending torque is greatest. Similarly, the adjacent distance between flexible muscles, as seen in FIGS. 11A-D, does not have to remain constant, but can vary as desired for a specific need (i.e. more strength near the wall, muscles not parallel to each other). Also, the disclose hydraulic arm can provide a pulling force that is many times its lifting force, thus, such an arm may be attached to a ceiling so that it can lift very heavy equipment. A longer an more dexterous hydraulic arm can be made by attaching additional hydraulic arm sections end to end (i.e. an additional arms 200 connected where gripper 210 is), and providing individual hydraulic control to each section. In this way, different section of the arm can bend in different directions to snake around or through narrow passages and also provide arm movement control at its end. Finally, nearly an endless number of arrangements and patterns for the placement of flexible muscles are possible, and only a few specific examples are shown here. By arranging the muscles properly, one can maximize the strength of the arm in the desired direction (i.e. to provide strong lifting strength).

OPERATIONAL DESCRIPTION

FIGS. 1-10

Operation of the disclose flexible hydraulic muscles is exactly opposite the normal operation of existing flexible hydraulic muscles. Both prior art and the Applicant's invention are designed to provide useful work when contracting. However, prior art muscles are designed to contract when hydraulic pressure is applied to it and extend when pressure is released. The Applicant's invention operates exactly the opposite, extending when hydraulic pressure is applied and contracting when pressure is released. To provide useful work while contracting, energy is stored in a bias spring when the hydraulic muscle is pressurized, so that when pressure is released, the stored energy can provide useful work. This process of hydraulic energy storage and release allows one to design a flexible hydraulic muscle that contracts very strongly. Hydraulic muscle with contraction forces greater than 5000 pounds per square inch cross-section tension (3.45 MPa) are certainly possible. For very high strength hydraulic muscles above 5000 psi, the percentage change in length can be reduced and heavier spring material used to provide the increased tension.

In FIG. 1A, we see muscle 20 near its fully contracted position. The muscle works by attaching between two components and then providing a contracting force between the components to pull them toward one another with considerable force. Port 22 can be screwed into socket made for it and ring 30 on the other end attached to the component being moved. For muscle 20, fluid port 22 is attached to one component and attachment ring 30 is attached to the other component. Fluid port 22 also provides connection for a hydraulic fluid source to pressurize the muscle. During operation, hydraulic fluid under pressure is forced through fluid port 22 into central channel 26 within bellow 24, where the pressure tends to expand bellow 24 longitudinally. This expansion, moves attachment ring 30 away from fluid port 22 and longitudinally expands the bellow wall's corrugation. When fully pressurized, muscle 20 can be extended as seen in FIG. 1B, where six corrugation sections have expanded from length L1 to length L2. Muscle 20 can provide some extending force during this pressurizing process, but the extending force is very limited because of the flexibility of bellow 24. Additional supports can be added that provide rigid longitudinal expansion of bellow 24 if desired. In that case, the hydraulic muscle loses its flexibility, but gains the ability to exert force both during expansion and contraction of the muscle.

Once pressurized and extended, as seen in FIG. 1B, hydraulic fluid pressure can be closed off and muscle 20 can remain in this extended condition indefinitely without additional energy input. The muscle can be quite flexible in this extended state and components attached to each end of the muscle can move relative to each other within the range of flexibility of the muscle, but not beyond its length without overcoming the internal spring bias of bellow 24. If the extending force exceeds the spring bias at the extended position, the internal pressure can drop to zero and then cause cavitation (vacuum cavity in hydraulic liquid) to allow the muscle to extend further. This ability to extend beyond its present length without fluid flow, can significantly reduce peak stresses within the hydraulic muscle and equipment when placed in a real system. The hydraulic muscle can also be forced to shorten because of its flexibility. The hydraulic muscle simply bows or kinks in the middle. The amount of bow will depend on how muscle 20 is constructed and the length of bellow 24. The longer bellow 24 is, the more easily it can bend. This compression flexibility, means the hydraulic muscle presented in this patent will often be used in pairs. This is, to provide powered motion for both extending and retracting such items as a lever arm (see FIG. 9) and other motion controlled systems.

If pressure is allowed to escape under pressure from inside bellow 24, spring tension within the material making up bellow 24 pulls strongly on both attachment ends 22 and 30 of muscle 20 to produce a retracting force. If a liquid is used as the hydraulic fluid, the hydraulic fluid can be considered almost incompressible and does not change volume significantly with pressure. This being the case, when hydraulic fluid is allowed to escape under pressure from the interior of the hydraulic muscle, very little hydraulic fluid needs to leave through port 22 to reduce the interior pressure to atmospheric (zero gauge). At zero gauge pressure the full bias tension within bellow structure 24 is pulling on ends 22 and 30. This provides a maximum force for the muscle (for that amount of stretch). If the component(s) attached to the muscle moves, then more fluid must leave port 22 to maintain the zero gauge pressure. If the fluid flow is restricted or slowed, a positive pressure can be maintained within muscle 20, which reduces the tension on the ends of the muscle. Because of this cause and effect, the position and rate of movement of attachment ring 30 can be controlled by controlling the volume and rate of fluid flow in and out of port 22.

The reader will notice that muscle 20, and others in this patent, require full hydraulic fluid pressure to extend the muscle (bellow 24). If a single hydraulic muscle is used for moving a component, that component uses the maximum force that hydraulic muscle can produce. This is inefficient and wastes energy if only a fraction of the full force is needed at that time. To get around this efficiency problem, many hydraulic muscles can be used together for moving a single component. When less force is needed, only the number of muscles needed are depressurized. The remaining hydraulic muscles stay pressurized and simply bend to accommodate the contraction of the other hydraulic muscle fibers. Then during the pressurizing phase, only those muscles that where contracted need to be refilled with hydraulic fluid. This economizes energy. For example, using a bundle of ten hydraulic muscles together can provide very efficient operation at 10% maximum tension (one muscle) as well as 100% maximum tension (all ten muscles). Also, a different number of fibers can be used during different portions of the contraction. For example, if very powerful force is needed at first, but then only light tension is needed after that, the ten muscle bundle discussed above could use all ten muscles to contract at the start and then use only a single muscle after that. In this way, only one muscle needs to be refilled completely with hydraulic fluid, the other nine only need to be topped off with hydraulic fluid to regain their full length. Further, if the range of motion of the component is less than the range of motion of the muscle, then the muscle does not need to be completely extended, but only filled until the needed length is met.

Another way to conserve energy with hydraulic muscle 20 is to use them in push-pull pairs, such as is shown in FIG. 9. Such a pair of muscles operate in the opposite direction of the other. That is, when one is contracting the other is extending and vice-a-versa. Thus, the fluid from the contracting hydraulic muscle can be routed to the extending hydraulic muscle. By placing a hydraulic pump 185 and a fluid channel 195 between the two hydraulic muscles, the pump only needs to provide the difference in pressure between the two muscles. By pumping only the difference in pressure, the push-pull hydraulic muscle pair can be operated more energy efficiently. Combining a system that uses multiple muscles that can be operated independently, and a hydraulic fluid pumping system that can directly pump hydraulic fluid from one set of hydraulic muscle to its opposing hydraulic muscles can provide a very efficient hydraulic system. Accumulators can also be used to store hydraulic pressure from one muscle as it contracts, before being used to extend another muscle. The hydraulic pump then only needs to pump the hydraulic fluid against the difference in pressure between the accumulator and the muscle being extended.

In FIG. 2 we see flexible hydraulic muscle 40 which works substantially the same way that muscle 20 works from an operational point of view. Internally, muscle 40 operates slightly differently than muscle 20. When fluid flows into muscle 40 through port 42, pressure builds within bellow 44 until bias tension within spring 46 and within bellow 44 are overcome. With sufficient hydraulic pressure, end seal 48 is pushed away from fluid port 42, thereby extending muscle 40. The corrugated nature of bellow 44 allows it to expand and contract longitudinally while at the same time withstand hydraulic pressure inside it. Spring 46 is surrounded by the hydraulic fluid entering port 42 and spring 46 and bellow 44 continue to expand as fluid enters the muscle. Once extended, muscle 40 can be used to provide a contracting (tension) force between components attached to port 42 and ring 50. Bellow 44 does not need to provide significant biasing because of the strong biasing of spring 46. If bellow 44 can be made significantly lighter than the bellow 24 care should be taken to ensure the bellow is not damaged during use. Dents or other damage to the bellow could cause it to fail prematurely. The bellow can also be placed inside the main biasing spring (for example spring 46) where it is protected by the heavy construction of the spring, much like containment tube 64 is protected by spring 66 of hydraulic muscle 60 (see FIG. 3). Many other attachment methods can be used besides the screw on port 42 and ring attachment 50.

In FIG. 3 we see flexible hydraulic muscle 60 which has two fluid ports 62 and 68. The use of two fluid ports allow it to operate differently than muscles 20 and 40, if desired. With muscle 60, hydraulic fluid can enter and leave different ends of the muscle. This can allow pressurization on one end of the muscle and draining of hydraulic fluid from the other end. During operation spring 66 protects elastic containment tube 64 from damage. The bias in individual coils of spring 66 tend to evenly space themselves as muscle 60 expands longitudinally. This prevents large gaps to form in the spring which could allow elastic tube 64 to expand outward and rupture. In this design spring 66 provides most of the biasing force for contraction. However, as spring 66 is made of finer wire, more of the biasing force can come from the elastic tube. If tube 64 is made of a stiff elastic material like nylon, it can provide a significant biasing force when stretched. A wavy or corrugated shape to tube 64 can be used to provide biasing with stiffer material that normally would not provide sufficient stretch to work as a biasing material. Many combinations of elastic polymers and metal supports can be used to provide the desired biasing output.

In FIG. 4, muscle 80 provides a right angle turn for attachment with fluid port 88. Again hydraulic fluid can flow in one direction because of the two port design (82 and 88). Containment tube 84 in this design provides all the biasing tension, with radial support cords 86 keeping tube 84 from exploding due to hydraulic pressure. Cords 86 can be made of metals, polymers and/or structural fibers, such as, glass and carbon fibers.

In FIG. 5 we see muscle 100, which provides a fluid port 108 near its center. If port 108 is fixed to the frame of a device, then attachment loops 102 at each end of muscle 100 can retract independently. Thus, components attached to ends 102 will be pulled toward port 108, with the component having the least force resistance moving first. The component with the greater force on it will not retract until internal pressure can be reduced sufficiently (i.e. by retracting the less resistant component) so that the spring biasing on that side of the arm overcomes the greater force. Another option is to allow port 108 to float between the two halves of muscle 100. In that case, muscle 100 would behave very much like hydraulic muscles 20, 40, and 60.

In FIG. 7, hydraulic muscle 150 would operate nearly identically to hydraulic muscle 20 except it is much easier to build in a large prestress within the muscle. This large prestress allows the muscle to have a strong retracting force all the way to its fully retracted length. The prestress can also be fashioned so that the total tension in the muscle does not change as much between its extended and retracted positions. For example, if discs 120*a-f* are prestressed with 5000 pounds of tension in them and when fully extended they have 10000 pounds of tension, then the discs have about 50% of their maximum operational strain already built in. While this reduces the maximum percentage change in length (approximately 50% of unstressed discs) for the muscle, it provides a more consistent tension strength. For some systems, this built in stress is not important or can be built into the system after the hydraulic muscle is made. For example, hydraulic muscles 180 and 190 are opposed to one another, so they both can be pre-stretched when they are attached between arm 186 and platform 192, and this tension can be balanced out by lever arm 186. In this way, neither muscle 180 or 190 can ever retract sufficiently to reach their fully retracted position (zero external tension) and they effectively become "prestressed". If only one muscle is being used, it can be stretched to prestress it, and then a stop placed on its movement so tension is always above a predetermined value until it retracts to the stop. This stop mechanism can also be placed internally within the muscle itself. For example, a center shaft passing through holes 128 of muscle 150, can extend between the two ends of the muscle and keep the muscle from retracting completely. The shaft would act as a stop, preventing the muscle from retracting completely. Providing stops between individual muscle segments can accomplish the same prestress, while preserving the flexibility of the muscle. In this way an un-prestressed muscle can be kept stretched to provide the needed prestress. Further complicating the tension in muscle 150 is that the tension does not change linearly with the change in length of the muscle. This is due to the shape of disc 120 which, like bellow 24, produces hoop strain within the body 124 of the disc which changes differently than the surface strain around the lip regions 122 and 126, and also on body 124. The result is a complex combination of forces providing longitudinal tension in muscle 150. Because hoop strain actual can reduce longitudinal tension once body 124 stretches passed the perpendicular. Then hoop strain actually tends to force lip 126 away from lip 122 instead of pulling it back toward it. By balancing the hoop strain and the prestress, one can produce a muscle that provides a relatively constant tension (see FIGS. 8A-C).

In FIG. 8, we see an alternative hydraulic muscle disc 160. When multiple discs 160 are welded together they form a bellow type hydraulic muscle (see FIG. 7). Tension forces on such a muscle produce tension forces on the individual discs as shown by the arrows in FIG. 8. That is, ring shaped surface 162 is being pulled to the left, and ring shaped surface 166 is being pulled to the right. As disc 160 is stretched in this way, disc body 164 resists due to both surface strain and hoop stain. The surface strain is the normal strain caused when a spring metal is bent. The hoop strain is the forces caused by the compression of the cone shaped disc into a flat condition. That is, in order to pull body 164 flat, the metal around surface 166 must be compressed radially and the metal around surface 162 must be stretched radially. Doing this creates a great amount of radial tension within body 164. At first this radial tension resists deforming disc (force outward to the right, and inward to the left) because of a contractive longitudinal component to the tension, but after passing through perpendicular, the direction of the longitudinal tension component reverses direction and the radial tension (force outward to the left, and inward to the right) begins to cause an expansion force. This reversal of longitudinal tension can be seen in the graph in FIG. 8A as the tension due to hoop strain changes from longitudinal tension to longitudinal expansion forces. When this changing hoop strain tension is combined with the linear tension from surface strain, a somewhat constant longitudinal tension results as seen in FIG. 8C. However, the dip in the second half of the graph, in FIG. 8C, shows that at a given tension (see Average Tension line), it is possible for disc 160 to be in one of three possible stretch lengths. When stretching a muscle made of multiple discs 160, individual discs would tend to abruptly lengthen as tension increased to a value near the top of the first maximum in the graph. This lengthening would tend to lower the total tension in the muscle and the stretched disc's tension can slide into the dip in the graph. This would cause the other discs to retract slightly away from the first maximum, until further stretching caused another disc to stretch pass the first maximum and slide into the dip section of the graph. This would cause a rather jittery operation as each disc abruptly extends and retracts. Luckily, this dip in the tension force can be easily eliminated by reducing the magnitude of the tension caused by hoop strain, so that the tension due to surface strain is always increasing faster than the tension due to hoop strain is decreasing. In this way, the total longitudinal tension is always increasing (though at a slowed rate to provide a "Range of Relatively Constant Tension") and there is never a dip in the tension graph as the muscle is stretched.

In FIG. 9 we see a simplified backhoe with a scoop on the front. Flexible hydraulic muscles 180 and 190 alternate their tension force to move scoop 182 up and down respectfully. With scoop 182 down, muscle 180 is pressurized and extend. Since the muscles are flexible and can bend, muscle 190 may also be in its extended configuration when in this lowered scoop position but would be bent (bowed) to accommodate the shorter space it has with the scoop lowered. To raise scoop 182, hydraulic fluid is released from muscle 180 which results in a contracting force within muscle 180. If muscle 190 is already extended (but bent), muscle 190 simply straightens as scoop 182 raises. However, if muscle 190 is in its contracted state, hydraulic fluid can be forced into the muscle to extend it and allow scoop 182 to rise. If the tension on muscle 190 is smaller than the biasing tension on muscle 180, muscle 180 can overpower the biasing tension in muscle 190 and extend it even without additional fluid sent to it. However, such extending without fluid flow will cause cavitation (vacuum space) within muscle 190 which could cause damage to the system if tension on the muscle was suddenly released. In such a case, the hydraulic muscle could contract at high speed with no fluid resistance to slow it down, until the vacuum space was collapsed. The sudden stop when the vacuum space was gone could cause very high stresses within the system. If fluid is allowed to flow in, the fluid pressure to extend muscle 190 can be relatively small since the contracting force on muscle 180 is also trying to extend muscle 190. Thus, hydraulic fluid from muscle 180 can be pumped directly to muscle 190 with a pressure difference that depends on the load within bucket 182, and the position (stretch lengths) of the muscles. To lower the scoop, gravity can assist, allowing the scoop to lower without any pumping action by simply allowing hydraulic fluid to flow from muscle 190 to muscle 180. Notice that if muscles 180 and 190 have increasing tension as their length increases, then the more extended (stretched) the muscle the higher pressure needed. Thus, simply opening valves to allow hydraulic fluid to flow between the muscles, will tend to move arm 186 to an average position where the pressures equalize within the muscles. From there, hydraulic fluid can be pumped to further move arm 186. This pumping of hydraulic fluid from one pressurized muscle to another pressurized muscle uses much less energy than pumping hydraulic fluid from zero gauge pressure to the pressure within the muscles. Alternatively, the hydraulic fluid within muscle 190 can remain sealed in, and hydraulic fluid pumped into muscle 180 under high pressure. Muscle 190 would bend to allow arm 186 to lower scoop 182. This second method can use considerably more energy than pumping hydraulic fluid between two flexible hydraulic muscles.

In FIG. 9, if a lateral stiffening support structure is used on hydraulic muscle 190, then hydraulic muscle 180 can be eliminated. Operation of such a design would be accomplished by adding and removing hydraulic fluid from muscle 190 with a lateral stiffening structure. Hydraulic pressure within muscle 190 causes it to extend and push upward on arm 186, lifting scoop 182. The lateral stiffening structure keep flexible muscle 190 from bowing outward from straight alignment, thus the hydraulic pressure within muscle 190 creates an extending force depending on the hydraulic pressure applied and the spring bias of muscle 190. To lower, or dig, with scoop 182 hydraulic fluid is allowed to be removed from muscle 190, which allows spring bias within muscle 190 to pull down strongly on lever arm 186 and lower scoop 182. In this way a single hydraulic muscle (with lateral stiffening) can provide both lifting and lowering of scoop 182.

In FIGS. 10A, 10C and 10D we see a number of positions for hydraulic arm 200. In FIG. 10A arm 200 is in its fully retracted position. Hydraulic fluid (liquid) can be forced into muscles 202a-d through end ports (not shown) on the muscles' wall end. These end ports can be connected directly to wall 220 to provide both support for the hydraulic arm and for fluid influx and removal. Control valves and other hydraulic control equipment could be connected on the opposite side of wall 220. If hydraulic fluid is forced into arms 202a-d in equal volumes, then arm 200 will extend substantially in a linear manner until it reaches its maximum length as seen in FIG. 10C. If different amounts of fluid are forced into the muscles, then the arm will tend to bend in the direction of the muscle receiving the least volume of hydraulic fluid (assuming all muscles are identical). For example, to arch arm 200 upward from the position in FIG. 10C, to the position in FIG. 10D, hydraulic fluid can be released from muscles 202*a-b*. This release of fluid reduces the pressure within these muscles and allows the spring biasing in muscles 202*a-b* to contract them. Muscles 202*c-d* remain at substantially the same length (no flow of hydraulic fluid), so arm 200 must arch upward to accommodate the shorter length of muscles 202*a-b*. When fluid flow is shut off, the arm stops moving and becomes rigid again. Alternatively, the same movement of arm 200 can be achieved by forcing additional hydraulic fluid into muscles 202*c-d* causing them to lengthen at the same time. With the centerline length of muscles 202*a-b* substantially fixed, the arm arches upward. Side to side motion would be provided by similar fluid volume differentials between muscles 202*a*&*c* and muscles 202*b*&*d*. To conserve energy, hydraulic fluid may be pumped from muscles 202*a-b* to muscles 202*c-d* to provide substantially the same movement. If all four muscles 202*a-d* are the same, the pressure difference between muscles 202*a-b* and 202*c-d* will be relatively small.

Many other parameters can be tweaked with the design of hydraulic arm 200. For example, the muscles themselves can worked to induce residual stresses (removing set), or tailor with specific tension profiles in different sections of the muscle for a specific purposes. A maximum-length stop may be added to each muscle or to the entire hydraulic arm, so that the muscles can not over-extend and permanently deform themselves or reduce their cycle life. Also, the longitudinal spring biasing of the muscle segments may be different in different sections of the muscle to provide special qualities to the muscle and arm. Additionally, the muscle sections can have a constantly increasing tension as they stretch to provide stable spacing between segments 204*a-d* as they are stretched. If a drop in tension occurs (relatively unusual, but possible—See FIG. 8C) during extension of the hydraulic muscle, the hydraulic arm could become unstable and kink, as different sections of the hydraulic muscles suddenly shift to a different strain length for the given tension.

RAMIFICATIONS, AND SCOPE

The disclosed flexible hydraulic muscle provides contracting force in a compact, high power density device. It can be used in many applications that presently use hydraulic pistons for motion control, while providing an inherent dampening function. Force and range of motion for the disclosed hydraulic muscle can be nearly the same as a similarly sized hydraulic piston using equal hydraulic pressure.

Although the above description of the invention contains many specifications, these should not be viewed as limiting the scope of the invention. Instead, the above description should be considered illustrations of some of the presently preferred embodiments of this invention. For example, the diameter of a hydraulic muscle can change along its length and does not need to be a constant diameter. Varying the diameter can allow sections to extend different amounts under the same hydraulic pressure. This can allow tailoring the tension in the muscle to meet specific needs. Similarly, many different shapes and styles of muscle construction can be imagined. Tuning the shape of bellows or springs can provide specific tension and displacements desired. Also, the hole down the center of bellow style hydraulic muscles (single bias spring system) can be made very small so fluid flow within the hydraulic muscle tends to dampen rapidly changing forces, such as, the backlash after over-tension on the muscle produces a vacuum cavity in the hydraulic fluid within the muscle. Many types of materials and bonding method can also be used to create a hydraulic muscle. For example, to produce a light-weight hydraulic muscle, carbon composites may be used, with discs much like discs 120 and 160. However, for composites other bonding means will be needed to bond the composite discs together. For example, one could use ring-shaped U-shaped channels crimped to hold adjacent discs together. A sealing layer placed between the channel and the discs, and/or between the discs themselves would prevent fluid leakage during longitudinal expansion and contraction of the muscle. Finally, many ways exist for laterally stiffening a flexible hydraulic muscle. Lateral stiffening can even consist of a tube the muscle slides through, which keeps it from buckling. This tube can even be curved or angled to work around corners with the flexible muscle simply following the path of the tube during both extending and retracting of the muscle.

Thus, the scope of this invention should not be limited to the above examples but should be determined from the following claims.

I claim:

1. An elongated flexible muscle having an extended and retracted length, comprising:
   a) a longitudinal biasing means defined on said elongated flexible muscle for providing a contracting force along the direction of elongation of said elongated flexible muscle at both said extended and retracted length and being longitudinally extendible and retractable with said elongated flexible muscle;
   b) a fluid containment means defined on said elongated flexible muscle for containing a working fluid under pressure, and being longitudinally extendible and retractable with said elongated flexible muscle;
   c) a radial support means defined on said elongated flexible muscle for resisting radial expansion of said fluid containment means when fluid pressure is applied, and being longitudinally extendible and retractable with said elongated flexible muscle;
   d) at least one fluid port for introducing and removing said working fluid under pressure from said fluid containment means;
   e) an attachment means defined on said elongated flexible muscle for connecting the muscle to at least two external components, wherein useful work is done as said two external components are pulled together by said elongated flexible muscle when said working fluid is allowed to escape under pressure from said fluid containment means; and
   f) wherein said longitudinal biasing means, and said fluid containment means is provided by the same structure.

2. The flexible muscle in claim 1, wherein;
said working fluid is a gas, wherein the operating pressure of said gas is greater than one-hundred pounds per square inch.

3. The flexible muscle in claim 1, wherein;
said working fluid is a liquid, wherein the operating pressure of said liquid is greater than three-hundred pounds per square inch.

4. The flexible muscle in claim 1, further including;
a lateral stiffening means for substantially reducing bending and bowing laterally of the flexible muscle when experiencing external compressive forces on the muscle.

5. The flexible muscle in claim 4, wherein;
said lateral stiffening means comprises one or more additional elongated flexible muscles connected along their length at a plurality of locations to the first flexible muscle, wherein each connection defines a specific fixed distance between the flexible muscles, wherein the muscles are substantially adjacent to one another.

6. The flexible muscle in claim 1, further including;
one or more additional elongated flexible muscle, wherein the additional muscles are positioned substantially adjacent to the first muscle and further including a plurality of connecting plates attaching the muscles together at a predetermined distance from each other at a plurality of locations along the muscles' length.

7. The flexible muscle in claim 6, wherein;
the flexible muscles are positioned substantially parallel to each other with said predetermined distance the same for each connecting plate.

8. The flexible muscle in claim 6, wherein;
the flexible muscles are not positioned substantially parallel to each other and not all connecting plate having the same said predetermined distance.

9. The flexible muscle in claim 1, wherein;
said longitudinal biasing means, said fluid containment means, and said radial support means is provided by the same structure.

10. The flexible muscle in claim 9, wherein;
said elongated flexible muscle comprises a plurality of prestressed washers welded one to another to form a longitudinal tube, wherein the outer edge of a specific prestressed washer is welded to the outer edge of the adjacent prestressed washer on one side, and the inner edge of the specific prestressed washer is welded to the inner edge of the adjacent prestressed washer on the other side.

11. The flexible muscle in claim 9, wherein;
said working fluid is a liquid, wherein the operating pressure of said liquid is greater than one thousand pounds per square inch.

12. A method for efficiently moving a lever arm about a pivot joint with two or more flexible hydraulic muscles having an extended length and a retracted length comprising; a biasing means defined on each of the flexible hydraulic muscle for providing a contracting force at both the extended and retracted lengths, a hydraulic fluid containment means for allowing introduction, removal and containment of a hydraulic fluid in liquid state under pressure, and a radial support means for resisting radial expansion of the hydraulic fluid containment means when hydraulic fluid pressure is applied, wherein at least one first flexible hydraulic muscle is attached to the lever arm to generate a first torque about the pivot joint in a first direction, and at least one second flexible hydraulic muscle is attached to the lever arm to generate a second torque in a second direction substantially different from the first direction, wherein the first and second flexible hydraulic muscles are connected by a fluid channel through a hydraulic pump, comprising the step of:
a) pumping the hydraulic fluid from said first flexible hydraulic muscle with the hydraulic pump and into said second flexible hydraulic muscle, wherein the biasing means of the first flexible hydraulic muscle helps force the hydraulic fluid through the hydraulic pump and into the second flexible hydraulic muscle to improve efficiency, wherein the biasing means of the first flexible hydraulic muscle also provides said contracting force to create said first torque on said lever arm, and
b) pumping the hydraulic fluid from said second flexible hydraulic muscle with the hydraulic pump and into said first flexible hydraulic muscle, wherein the biasing means of the second flexible hydraulic helps force the hydraulic fluid through the hydraulic pump and into the first flexible hydraulic muscle to improve efficiency, wherein the biasing means of the second flexible hydraulic muscle also provides said contracting force to create said second torque on said lever arm, whereby the lever arm may be pivoted back and forth repeatedly by repeating steps a) and b).

13. A method for generating a contractive force for pulling two components toward one another under force with an elongated flexible muscle comprising; a longitudinal biasing means for providing said contractive force in the direction of elongation of the muscle even when fully retracted; a working fluid containment means for containment of a working fluid under pressure, a radial support means for resisting radial expansion of the working fluid containment means when working fluid pressure is applied, a fluid entry port connected to said flexible muscle and designed to allow the working fluid to flow in and out of said working fluid containment means and an attachment means for connecting the flexible muscle between the two components to be pulled toward each other, wherein said flexible muscle is extendible and retractable between an extended length and a retracted length, comprising the steps:
a) pressurizing said working fluid containment means with the working fluid to extend said flexible muscle beyond its retracted length;
b) moving one and/or both of the two components away from each other so that their separation is greater than the retracted length of the flexible hydraulic muscle;
c) doing useful work while releasing the working fluid from within said working fluid containment means and allow said longitudinal biasing means to provide said contractive force within the flexible muscle, wherein said elongated flexible muscle comprises two or more separate flexible muscles connected in parallel, wherein said releasing the working fluid comprise releasing pressure on one or more of the separate flexible muscles.

14. The method in claim 13, wherein moving one and/or both of the two components is performed after pressurizing said working fluid containment means is complete.

15. The method in claim 13, wherein the flexible muscle further includes a lateral stiffening means for substantially reducing bending and bowing laterally of the flexible muscle when experiencing external longitudinal compressive forces.

16. The method in claim 15, wherein said lateral stiffening means comprises a second flexible muscle similar to the elongated flexible muscle, wherein the second flexible muscle is connected adjacent the elongated flexible muscle along their length by a plurality of connecting plates.

17. The method in claim 13, wherein steps a) and b) are preformed substantially at the same time.

18. The flexible muscle in claim 13, wherein;
said longitudinal biasing means, and said working fluid containment means is provided by the same structure.

19. The flexible muscle in claim 13, wherein;
said longitudinal biasing means and said radial support means are provided by the same component.

* * * * *